M. LAZARUS AND W. B. DAVIES.
PLATE PRINTING PRESS.
APPLICATION FILED JAN. 14, 1921.
1,389,251.
Patented Aug. 30, 1921.
10 SHEETS—SHEET 7.
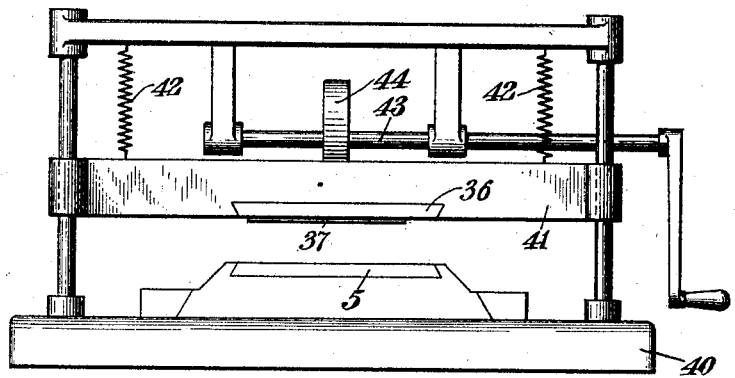
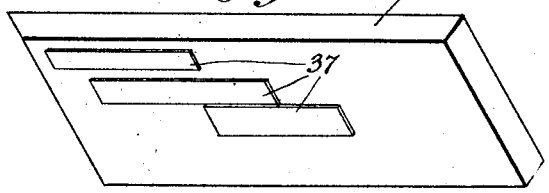
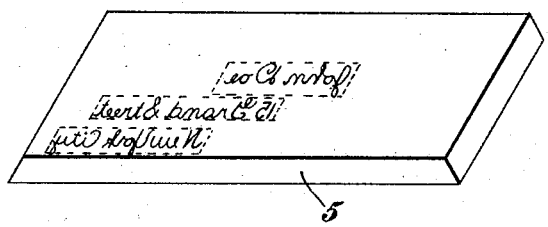

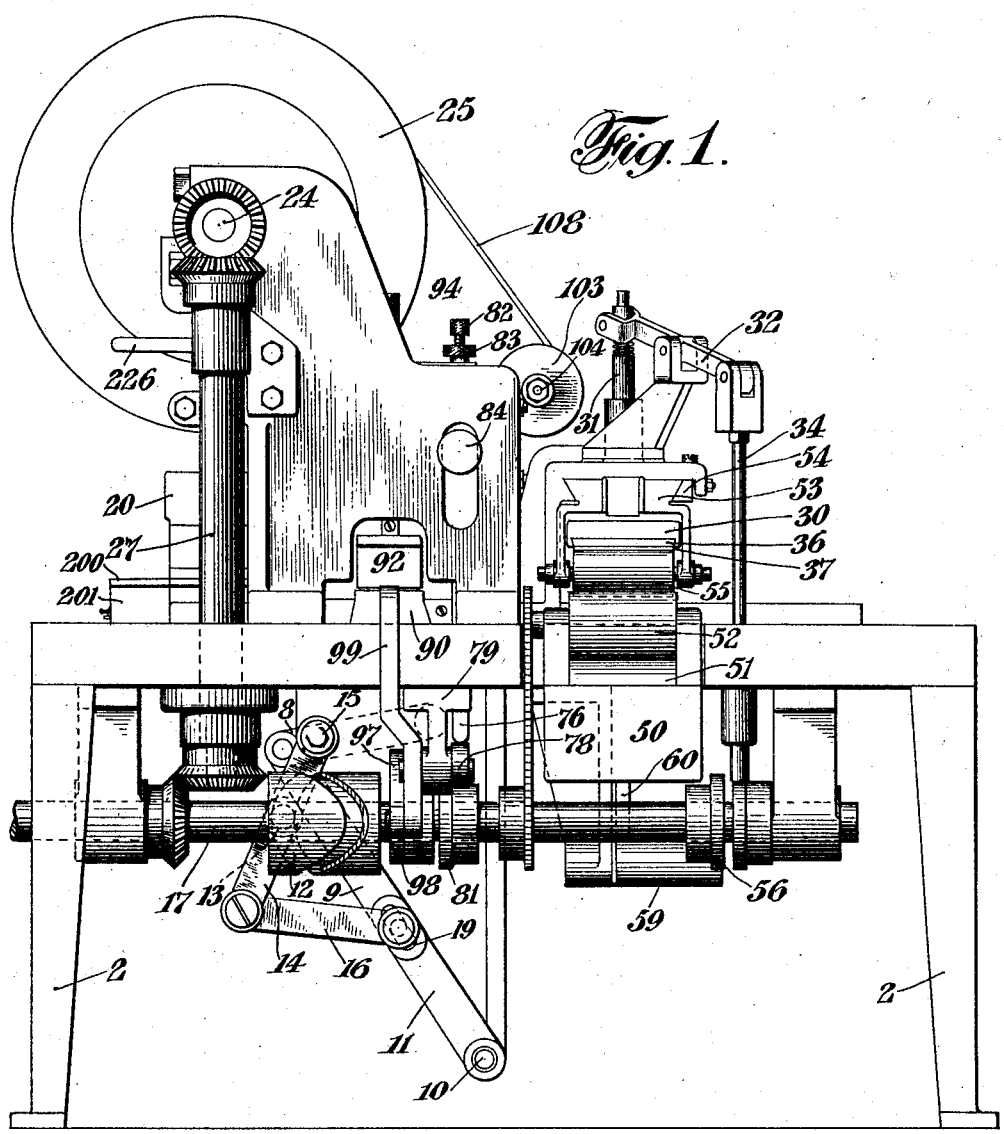

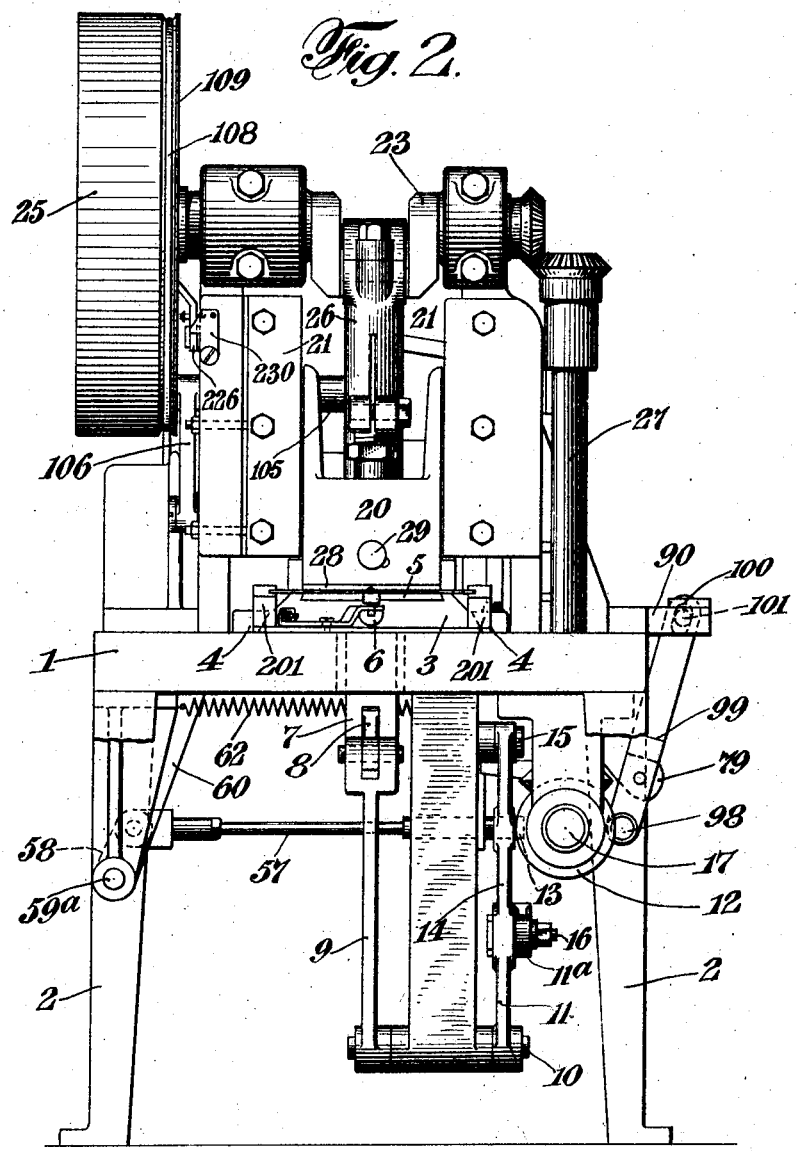

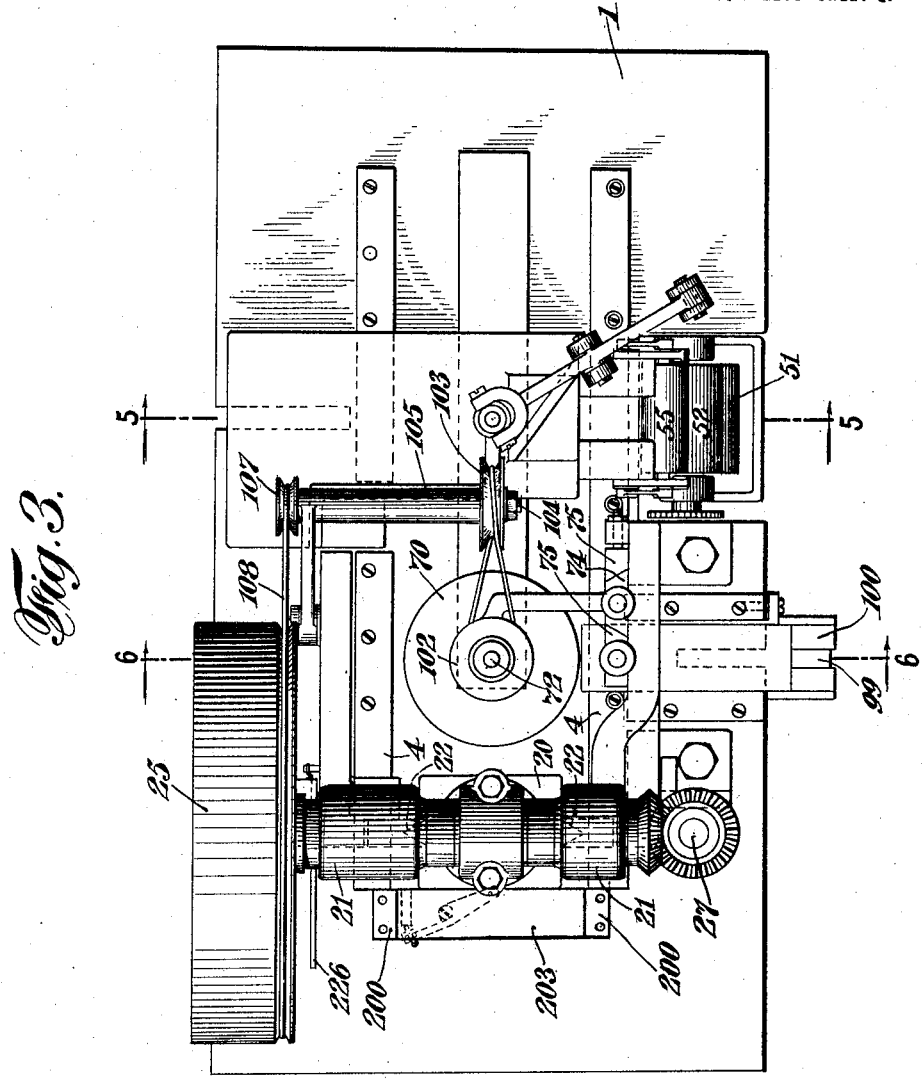

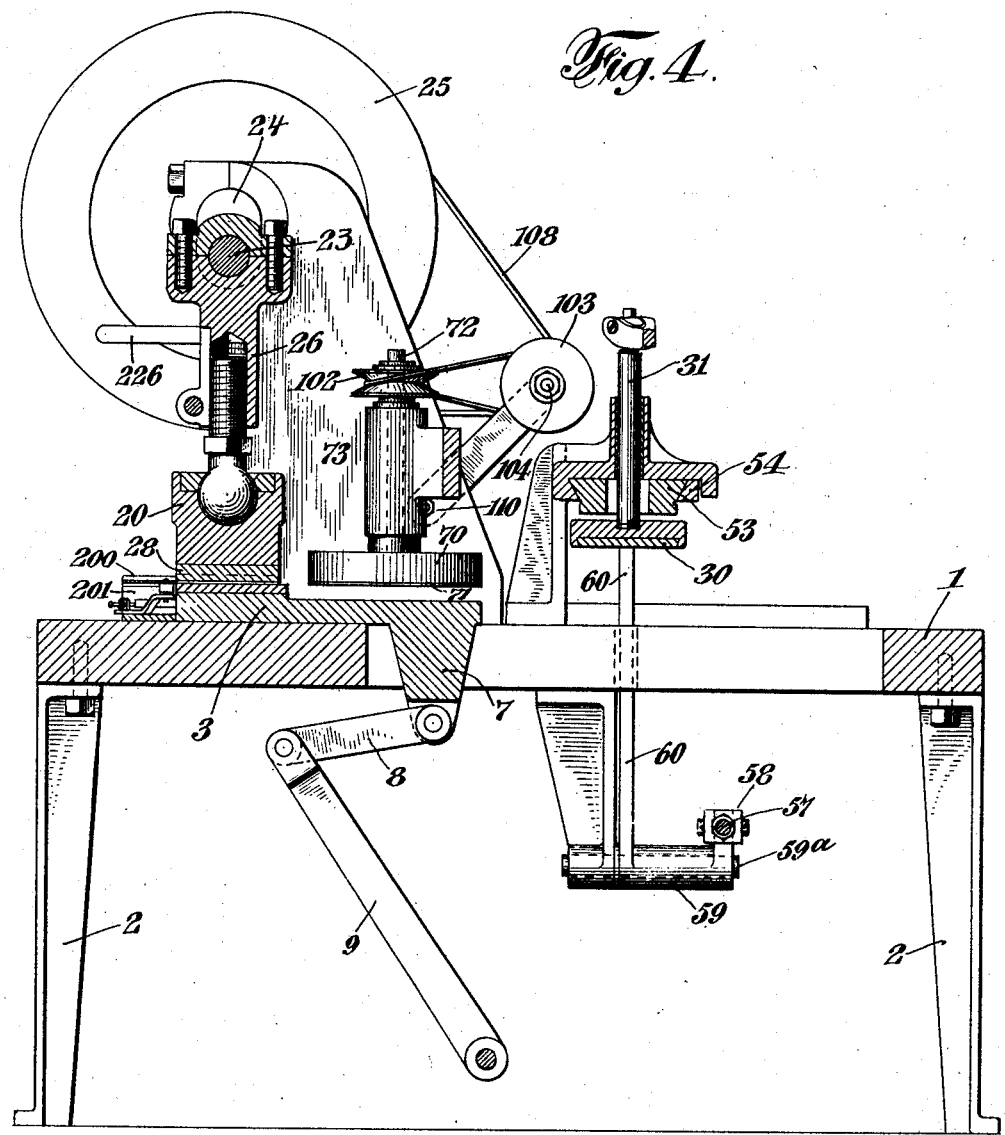

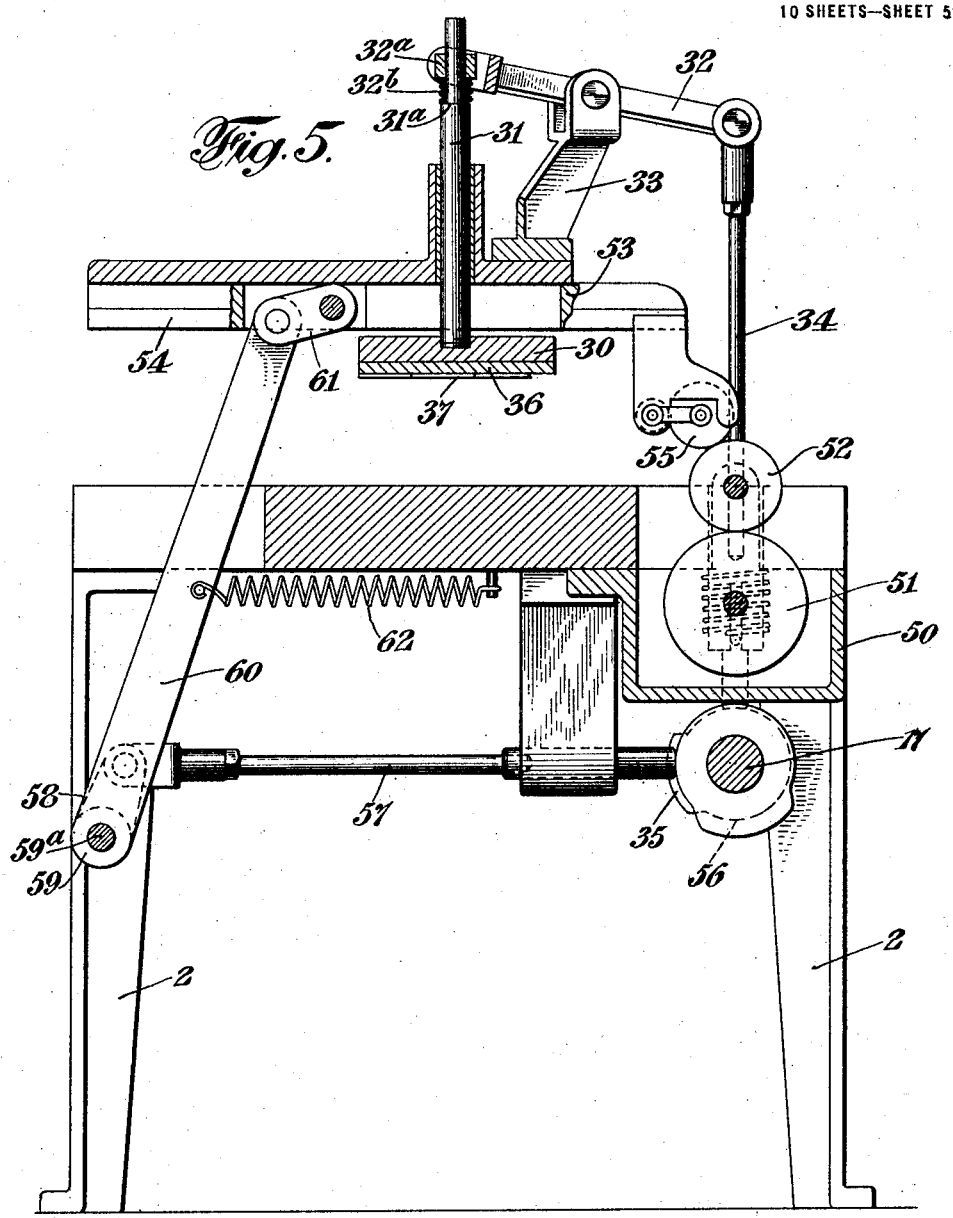

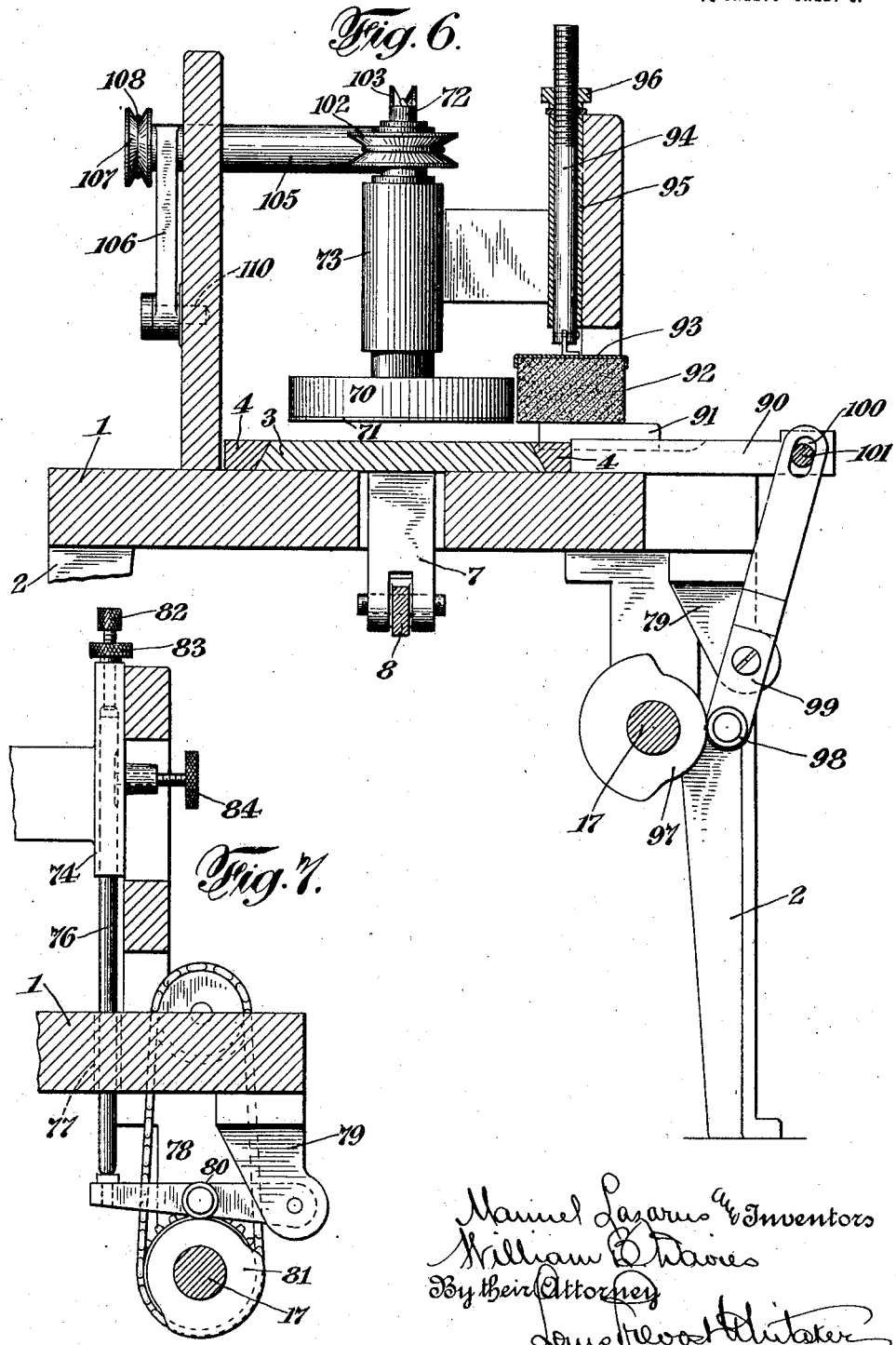

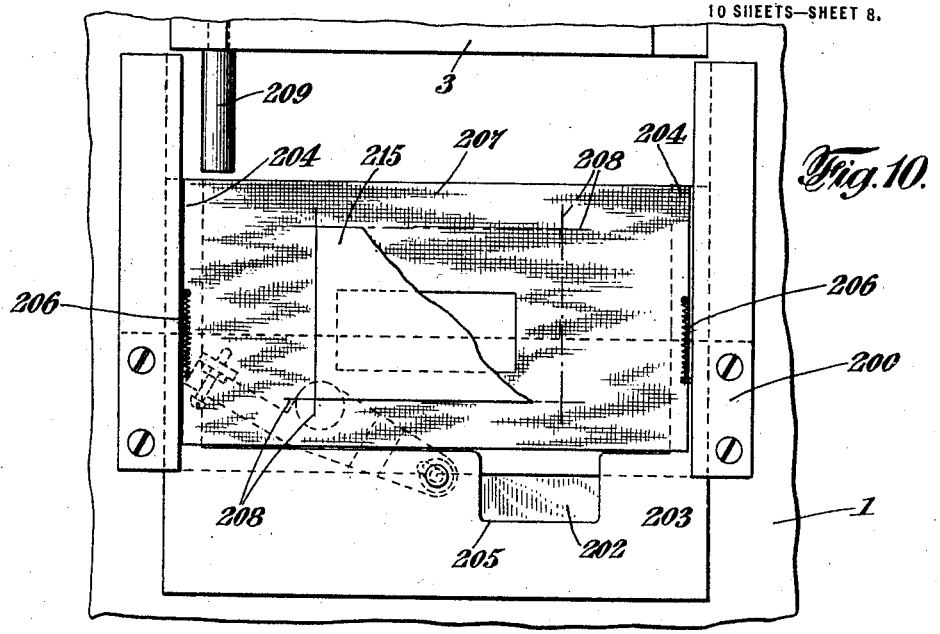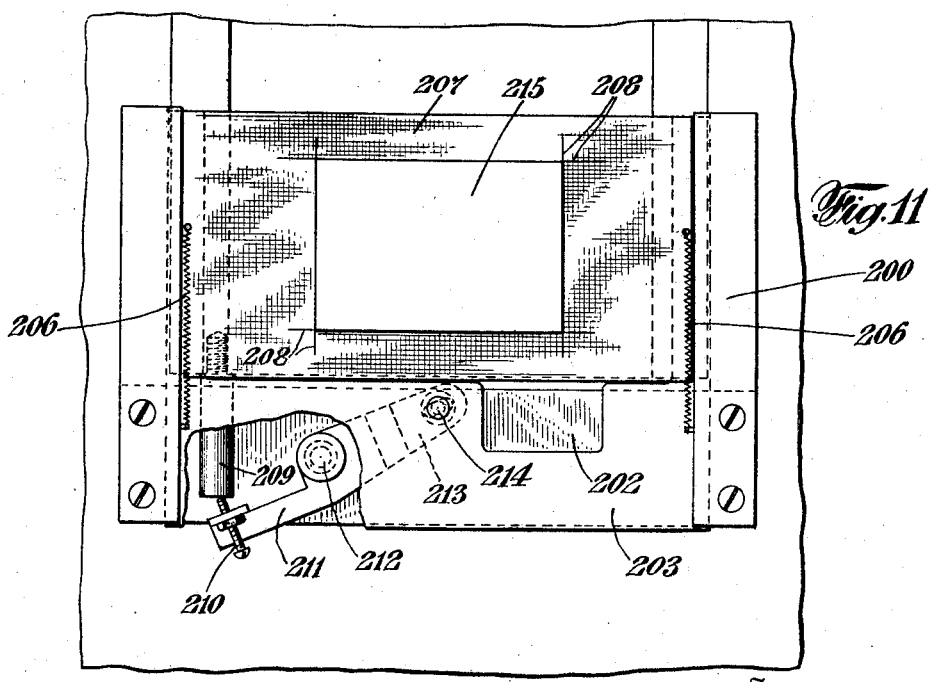

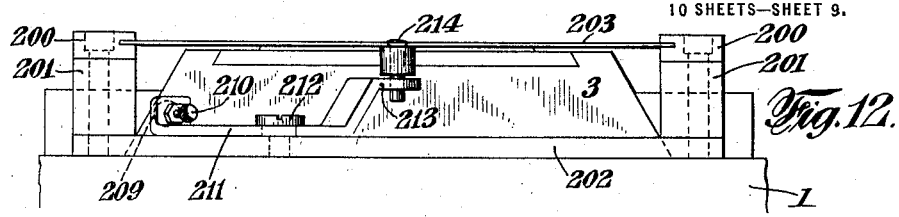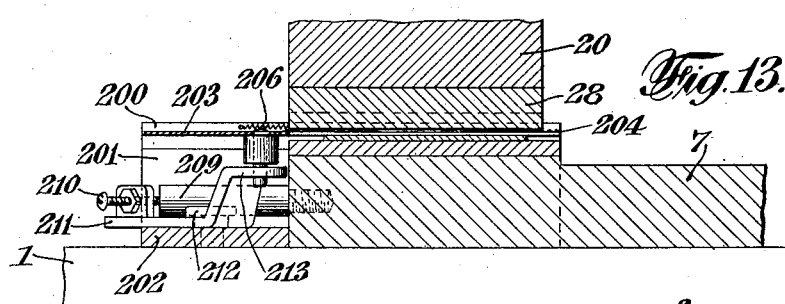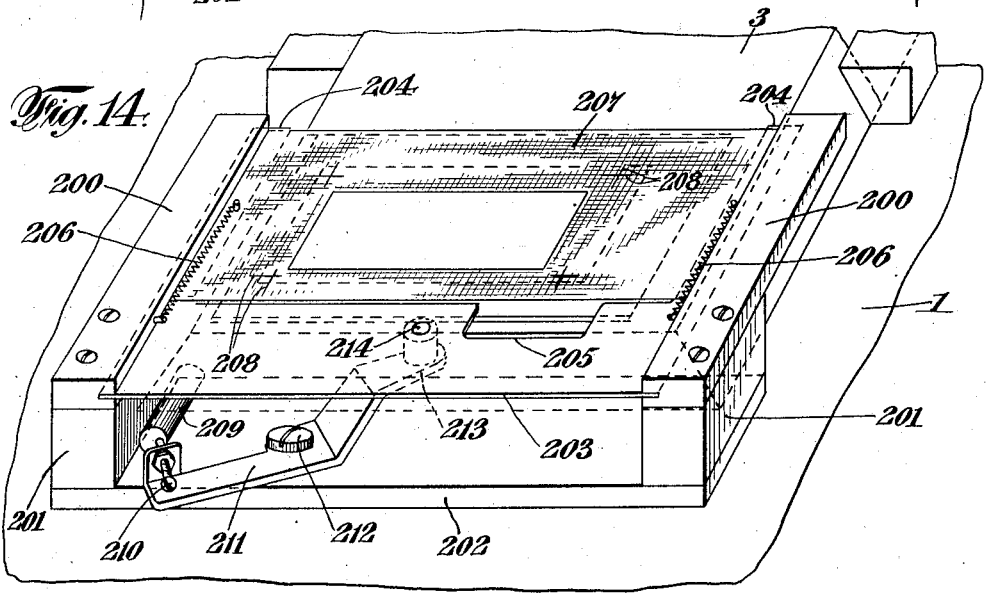

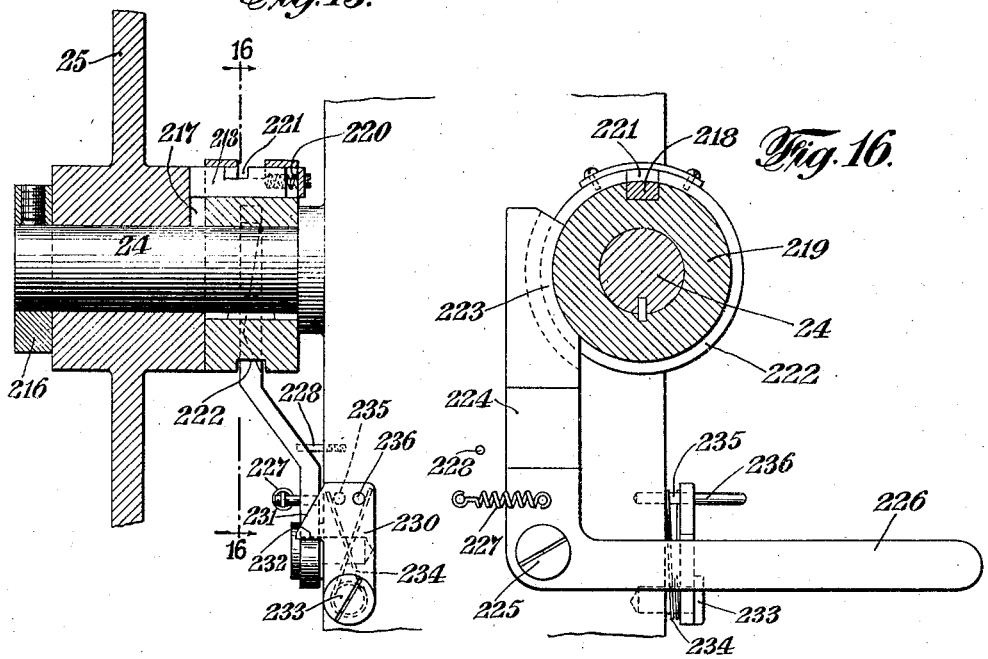

UNITED STATES PATENT OFFICE.

MANUEL LAZARUS, OF NEW YORK, N. Y., AND WILLIAM B. DAVIES, OF BRIDGEPORT, CONNECTICUT, ASSIGNORS OF ONE-FOURTH TO GUSTAVE MENDELSOHN, OF BROOKLYN, NEW YORK, AND ONE-FOURTH TO MEYER TRACE, OF BRIDGEPORT, CONNECTICUT.

PLATE-PRINTING PRESS.

1,389,251. Specification of Letters Patent. Patented Aug. 30, 1921.

Application filed January 14, 1921. Serial No. 437,187.

*To all whom it may concern:*

Be it known that we, MANUEL LAZARUS, a citizen of the United States, residing at New York, in the county of Bronx and State of New York, and WILLIAM B. DAVIES, a citizen of the United States, residing at Bridgeport, in the county of Fairfield and State of Connecticut, have invented certain new and useful Improvements in Plate-Printing Presses; and we do hereby declare the following to be a full, clear, and exact description of the invention, such as will enable others skilled in the art to which it appertains to make and use the same.

Our invention consists in the novel features hereinafter described, reference being had to the accompanying drawings which show one embodiment of our invention selected by us for purposes of illustration, and the said invention is fully disclosed in the following description and claims.

In the operation of plate printing presses for making impressions from engraved copper and steel plates, it has been customary for many years to ink the entire surface of the plate, usually with a roller, and then to wipe the ink from the surface of the plate, leaving it only in the engraved lines therein, and to dry and polish the plate usually employing a polishing material and completing the operation by passing the hand of the operator over the plate, after which the card or sheet is laid upon the plate and pressed into contact therewith, usually by sliding the platen carrying the plate beneath an impression roller. As the wiping and polishing of the plate must be employed for each impression, the production of impressions from such engraved plates is very slow and costly.

The object of our invention is to provide a machine by means of which impressions can be made from engraved plates more rapidly and cheaply, and by which hand operations are dispensed or reduced to a minimum. To this end our improved machine is constructed and arranged to provide a movable support for the plate traveling in a predetermined path, along which are located means for inking the plate, means for making the impression, and between said inking and impression means, a device for automatically wiping and polishing the plate to remove the ink from all portions thereof, except the engraved lines.

In order to facilitate the operation of the wiping and polishing device, we prefer to construct the inking mechanism so that it will apply ink only to the engraved portions of the plate without inking the entire face of the plate, and to this end we preferably employ an inking counter which is removable from the machine, and which is provided with isolated inking surfaces corresponding in location with the engraving portions of the plate. Only small portions of the surface of the plate immediately surrounding the engraved lines require to be wiped and polished.

We also prefer to employ a horizontally rotating wiping and polishing device having a rotating surface parallel with the plate, and movable into and out of position to engage the plate, which, in coöperation with the travel of the plate with respect to the wiping and polishing device, insures a thorough wiping and polishing of the plate after the inking thereof and before the impression is made. We also prefer to provide means for applying ink to the inking surfaces and means for applying polishing material to the wiping and polishing device, which are preferably operated during the operation of the impression mechanism, thus expediting the production of successive impressions from the plate.

Our invention also includes certain novel features in the construction, coördination and arrangement of the parts of the apparatus for the production of the desired results, which are hereinafter fully described and particularly pointed out in the claims.

In the accompanying drawings,

Figure 1 represents a side elevation of a plate printing press embodying our invention, and selected by us for the purpose of illustrating the invention.

Fig. 2 is a front elevation of the press.

Fig. 3 is a top plan view of the press.

Fig. 4 is a central longitudinal section of the press.

Fig. 5 is an enlarged tranverse sectional view of the press on the line 5—5 of Fig. 3, illustrating the inking apparatus.

Fig. 6 is an enlarged transverse sectional view of the press on line 6—6 of Fig. 3, illustrating the wiping and polishing apparatus.

Fig. 7 is a detail view of the wiper supporting slide and adjacent parts.

Fig. 8 is a detail view of an auxiliary press which we prefer to employ for preparing the inking and impression counters, illustrating the manner of preparing the counters for a particular plate.

Fig. 9 is a detail view of a plate carrying counter and one of the inking or impression counters therefor.

Fig. 10 is an enlarged plan view of a card or sheet feeding mechanism which we prefer to employ for automatically placing the cards or sheets in and removing them from impression position, showing the sheet or card supporting and positioning slide in its forward position, a portion of the card being broken away.

Fig. 11 is a similar view showing the card supporting and positioning slide in impression position.

Fig. 12 is a front elevation of the parts shown in Figs. 10 and 11.

Fig. 13 is a vertical sectional view of the same showing the positions of the bed plate slide and impression slide or plunger.

Fig. 14 is a perspective view of the parts shown in Figs. 10 and 11.

Fig. 15 is a detail view, partly in section, illustrating the clutch mechanism for starting and stopping the machine.

Fig. 16 is a side elevation partly in section showing the parts illustrated in Fig. 15.

Fig. 17 is a top plan view of the same.

Fig. 18 is a detail of the clutch disengaging blade and lever.

In the press herein illustrated, 1 represents the bed plate of the press, which is supported upon suitable legs or standards 2. 3 represents the movable support for the plate, which in this instance is in the form of a slide capable of reciprocating longitudinally of the bed plate between the lateral dovetailed guides 4. The slide 3 is provided with a removable counter 5 to which the engraved copper or steel plate is attached adhesively or otherwise in any well known way, and the slide is preferably provided with a retaining device 6 of any usual or preferred construction to hold the counter in locked position, in and upon the slide 3. The counter 5 can thus be removed for the attachment and removal of a plate without disturbing the other parts of the press.

In this instance means are provided for imparting reciprocating movement to the slide 3, which may be of any desired character. In this instance we have shown the slide 3 provided with a depending lug or bracket 7, which is connected by a link 8 to the upper end of a lever 9, pivoted to a rock shaft 10 mounted in the frame, and provided with a shorter arm 11 having a slotted portion 11$^a$. Motion is imparted to the lever 9 by means of a cam, in this instance a path cam 12, on a longitudinal shaft 17, said cam engaging a friction roll 13 on a lever 14, the upper end of which is pivoted at 15 to a bracket secured to the bed plate, while the lower end is connected by a link 16 to the slotted portions 11$^a$, of the arm 11, the slot providing a slight adjustment of the throw or travel of the slide 3.

At the front end of the machine and adjacent to one end of the travel of the slide 3, we locate the impression mechanism which comprises the following members: 20 represents a vertically movable impression slide or plunger mounted in vertical guides 21, the slide having V shaped lateral guiding portions 22, engaging corresponding recesses in the guides. The impression slide is reciprocated vertically in this instance by a crank 23 on a shaft 24, which in this instance is the main driving shaft of the machine, and is operated from a motor or line shaft by means of the driving pulley 25, the crank being connected with the impression slide by a connecting rod or pitman 26. The longitudinal shaft or counter shaft 17 before referred to is operatively connected with the driving shaft in this instance by means of a vertical connecting shaft 27 and bevel gears, as shown.

The impression slide is provided on its lower face with a removable impression counter 28, correspondingly held in operative position by a suitable locking or retaining device 29.

Above the slide 3, and adjacent to the rear end of its stroke or travel, we provide the inking mechanism, which comprises the following members. 30 represents a vertically movable inking device which is carried at the lower end of a vertical rod 31 mounted in a suitable guide, and normally held in raised position out of operative relation with the plate carrying slide 3. The inking device is depressed into operative relation with the plate by means of a rocker arm 32, pivotally supported on a bracket 33 and connected at one end to a sleeve 32$^a$ on the rod 31, the other end of the rocker arm being connected to a vertical actuating rod 34, mounted in guiding means in the bed plate and having its lower end in operative relation to a cam 35 on the shaft 17. A spring 32$^b$ (Fig. 5) is preferably interposed between the collar 32$^a$ and a shoulder 31$^a$ on the shaft 31, so as to force the inking device into contact with the plate, with a yielding pressure to insure the proper operation of the inking device under all conditions.

We have found that it is not necessary to ink the entire surface of the plate and that it is only necessary to apply ink to the portions immediately contiguous to the engraved lines. We therefore prefer to provide the inking device with a removable counter 36, secured thereto in any desired manner, and we provide this counter with isolated, raised inking portions 37 located in positions on the counter corresponding to the positions of the engraved portions on the plate. For convenience in preparing the inking counter, we prepare strips or pieces of suitable material of the desired thickness and of a width for example to cover a line of engraved words. The printing plate having been secured to its supporting counter, pieces of the inking material are cut the right length or size and carefully laid upon the engraved portions only of the plate. Adhesive material is applied to the lower face of the inking counter (or the strips or pieces of material) and the inking counter is lowered upon the said pieces of material in registration with the plate supporting counter, thus securing the inking surfaces in the proper relation to the counter to apply the ink only to the engraved portions of the plate. The inking device is so positioned that when the inking counter is in place therein and the plate holding counter is in its position in the slide 3, and the slide 3 is in its rearmost position the inking counter and the plate holding counter will be in registration.

As it is only necessary to press into printing contact with the plate those portions of the card or sheet which receive ink from the engraved portions of the plate, we also prefer to provide the impression counter 28, in a manner similar to that above described, with isolated impression surfaces, corresponding in location to the inking surfaces of the inking counter. We find it convenient to employ a small auxiliary press shown in Fig. 8 provided with a lower member 40 adapted to receive the plate supporting counter 5, and an upper member 41 adapted to receive either the impression counter 28 or inking counter 36, and to hold it in registering position with respect to the lower counter. The upper member is held in raised position by springs 42, and may be lowered upon the lower member by means of a shaft 43, and eccentric 44, to attach the inking surfaces, or impression surfaces, as the case may be. The press is provided with a plurality of each of the different counters, and by this means, a set of counters may be prepared for a job, while the press is in operation on another job, and after the completion of one job, it is only necessary to remove the counters from the impression slide, inking slide, and plate carrying slide, and substitute those prepared for another job, in the manner previously described, and proceed with the operation of the press.

The inking surfaces may have ink applied to them in any desired way between impressions. We have shown herein an ink supplying mechanism located at one side of the path of the plate slide 3, and comprising an ink receptacle 50, a roll 51 therein and a distributing roll 52 operating in contact therewith, motion being transmitted to said rolls by suitable sprocket gearing from the shaft 17. In order to apply the ink to the surfaces 37 of the inking device, we employ a transversely reciprocating slide 53 mounted in a guide 54, and carrying a transfer roll 55 so located as to contact with the distributing roll 52 when the slide 53 is at one end of its travel, and to pass beneath and in contact with the inking surfaces 37. The slide 53 is operated in timed relation with the other parts of the press, and preferably while the impression slide is down, by means of a cam 56 on shaft 17, which engages a push rod 57, connected to an arm 58 on a sleeve 59 mounted on a stud $59^a$, said sleeve carrying a longer arm 60, the upper end of which is connected by a link 61 with the slide 53. A retracting spring 62 returns the slide 53 to normal position with its transfer roll 55 in engagement with the distributing roll 52.

Between the inking mechanism and the impression mechanism is located the wiping and polishing mechanism which is so constructed and operated that on the stroke or movement of the plate carrying slide 3 away from the impression mechanism, which we term the outward stroke, the wiping and polishing mechanism is held out of contact with the plate, but is lowered into operative position with respect to the surface of the plate so as to wipe and polish the plate on the movement of the slide 3 from the inking mechanism toward the impression mechanism, which we term the return movement, thereby avoiding unnecessary wear upon the plate and the wiping and polishing device.

In this instance we have shown a wiping or polishing device 70 in the form of a horizontal rotating disk, the lower face of which is provided with a suitable wiping and polishing surface, indicated at 71, which may be of textile fabric, leather, or any other material. The disk 70 is carried on the lower end of a vertical driving shaft 72 mounted in a bearing 73 carried by a vertically movable slide 74, mounted in suitable vertical guides 75, secured to the bed plate. Vertical movement is imparted to the slide 74 by means of a vertical lifting rod 76 mounted in a guiding bush 77, in the bed plate, and having its lower end engaged by a lever 78 pivoted to a bracket 79 depending from the bed plate, and carrying a roll 80 engaging and resting upon an actuating cam 81 on the longitudinal shaft 17. The upper end of the lifting rod 76 enters a recess in the slide 74, and its upper end is engaged by an adjusting screw 82, threaded in the slide, and having its axis in alinement with that of the rod 76. This screw is provided with a set nut 83, and the slide is also provided with a set screw 84 engaging the rod 76 at right angles thereto. By loosening the set screw 84 and set nut 83, the wiper pad can be adjusted vertically so that in its lowest position, permitted by the cam 81, it will engage the plate with just sufficient friction to remove the very minute excess quantity of ink deposited on the surface of the plate, and polish the surface without materially abrading or in any wise injuring the polished surface of the plate. When the exact adjustment is secured it can be retained by setting up the nut 83, and set screw 84, until it becomes desirable to again adjust the wiper pad. We prefer to employ a screw 82 having fine threads of relatively slow pitch, so as to enable a practically microscopic vertical adjustment of the wiper to be effected.

We also prefer to provide suitable means for applying a polishing material to the surface of the wiper pad or disk 70 before each wiping and polishing operation thereof, and in the present instance we have shown a slide 90 movable transversely of the path or travel of the plate carrying slide 3, and supported in suitable guides on the bed plate. The slide 90 is provided with a transfer pad or brush 91 of any suitable material facing upwardly and supported so that when the slide 90 is moved inwardly the transfer pad will lightly engage the lower face of the wiper pad 70 and apply the desired amount of polishing material thereto. A supply of polishing material is secured to the bed plate in position to be engaged by the transfer pad when the slide 90 is moved outwardly, and we prefer to employ a dry polishing material, such as chalk, whiting, or any other suitable material in solid form, as a cake indicated at 92, and to support it in a holder 93 carried at the lower end of a vertically adjustable rod 94 mounted in a guide 95 supported on the bed plate and provided with a threaded portion engaged by an adjusting nut 96, by means of which the cake or body of polishing material can be supported in the proper position to be engaged by the transfer brush or pad so as to remove the desired quantity and transfer it to the wiper pad. The slide 90 carrying the transfer pad or brush is reciprocated in timed relation with the other parts of the press, and preferably during the operation of the impression mechanism, by any desired means. We have shown in this instance an actuating cam 97 on the shaft 17, arranged to engage a roll 98 on the lower end of a lever 99 pivoted to the bracket 79, depending from the bed plate, the upper end of the lever 99 being slotted at 100 to engage a pin or stud 101 on the slide 90.

Rotary motion may be imparted to the wiper pad in any desired way, and preferably continuously. We have shown the shaft 72 of the wiper pad provided with a grooved pulley 102, which is engaged by a quarter turned belt passing around a pulley 103 mounted on a horizontal shaft 104 carried in a horizontal sleeve 105 carried by a swinging arm 106 pivoted to a part secured to the bed plate, so that the axis of the shaft 104 may be maintained substantially in a horizontal line with the center of the grooved pulley 102. The shaft 104 is also provided with a grooved pulley 107 engaging a driving belt 108 which also engages a grooved driving pulley 109, in this instance formed integrally with the driving pulley 25 in the driving shaft 24. The arm 106 carrying the sleeve 105 may be rigidly secured or may have a slight play on its supporting pivot 110 in which case a portion of the weight of the sleeve and pulleys connected therewith will be exerted on the driving belts and will tend to maintain them in taut condition.

In the operation of the press it will be understood that the plate to be printed will be attached to one of the counters and the corresponding counters for the inking mechanism and for the impression mechanism will be provided with isolated raised inking and impression surfaces corresponding in location exactly with the engraved portions of the plate, in the manner hereinbefore described, and conveniently by the use of the auxiliary press before referred to, although that is not absolutely necessary. The counter carrying the engraved plate is then placed in the slide 3 and locked therein and the inking counter and impression counter are placed respectively in engagement with the inking device and the impression device, and locked in position in any usual manner, when the press is ready to be operated.

Power being applied to the driving shaft and to the longitudinal counter shaft, as before described, as the plate carrying slide 3 is moved rearwardly, the wiper pad will be elevated so as not to engage the plate on the slide, but will be lowered into position to engage the plate on the return stroke of slide 3, after the slide has passed the wiper pad on its outward stroke. At the end of its outward stroke the slide 3 will bring the printing plate underneath the inking counter, the plate carrying counter and the inking counter being in registration vertically, and hence the inking pad portions or the inking counter will register with the engraved portions of the plate. The inking device is then moved downwardly into contact with the plate to apply ink to the engraved portions only and the portions of the surface of the plate immediately surrounding the same, without inking the entire plate. We prefer to so construct the actuating cam for the slide 3 that there is a slight dwell imparted to the slide at each end of its reciprocatory movement which causes the slide to remain stationary an instant at each end of its travel so that the plate may be inked at the rear end of its stroke, and so that the impression can be made at the forward end of the return stroke.

The plate having been inked as before described, the slide moves forward on its return stroke carrying the plate beneath the horizontal rotary wiping and polishing pad 70 which is so delicately adjusted as to wipe off the very small quantity of superfluous ink, cleaning and polishing the plate, and as the pad is rotated at the desired speed and the plate is passed longitudinally beneath the wiping pad, all portions of the plate are cleaned and polished, the pad having been treated with a small quantity of polishing material in the manner hereinbefore described.

When the slide reaches its forward position at the end of the return stroke, the plate carrying counter will be in registration with the impression counter on the impression mechanism and the parts are so timed that at this instant the impression mechanism will be brought into operation. It will be understood that a card or sheet will be placed upon the inked, cleaned, and polished surface of the plate just as it arrives at its forward position beneath the impression mechanism, either by hand or by a suitable feeding mechanism, as hereinafter described. The impression device descends, carrying the isolated pad portions thereof into contact with the card or sheet and forcing it with sufficient pressure against the engraved portions of the plate, to cause it to receive the ink from the engraved lines in the plate, and produce the impression. While the impression mechanism is being operated the ink transferring slide 53 and the polishing material transferring slide 90 are operated as hereinbefore set forth, so as to apply ink to the inking surface of the inking device, and to apply polishing material to the polishing surface 71 of the wiper pad, so that the cycle of operation of the machine is shortened, thus increasing the speed of the press. The operations hereinbefore described are then repeated. By means of our improved plate printing press impressions may be made from engraved steel and copper plates with great speed and facility and with a minimum of hand operation, the press can therefore be operated without the necessity for the highly skilled labor required to perform the hand operations of making impressions from engraved plates as now ordinarily carried out, and the production of these impressions is therefore not only expedited, but greatly cheapened.

In the operation of our improved apparatus, the cards or sheets to be engraved can be placed by hand upon the plate, beneath the impression slide and removed by hand after the impression has been made. In order however, to prevent injury to the hands of the operator or feeder, and to enable the press to be operated at the highest possible speed, we prefer to provide means normally held out of vertical alinement with the impression slide to receive the card or sheet to be engraved and at the proper time to carry it and position it above the plate and beneath the impression slide and to remove it from the press after the impression has been made, thus obviating the possibility of injury to the operator, and enabling us to obtain a speed of operation which would not be possible to obtain safely if the cards or sheets were placed in the press beneath the impression slide by hand.

In Figs. 10 to 14 inclusive, we have illustrated in detail the mechanism for positioning the card or sheet, which we prefer to employ, and which is peculiarly adapted to coöperate with the other members of the press. The bed plate 1 of the machine is provided forward of the horizontal reciprocating plate carrying slide 3 with a pair of horizontally disposed rearwardly extending grooved guides 200, in this instance supported upon blocks 201, resting upon a transverse plate 202, secured to the bed plate 1 in any desired manner, the said guides extending rearwardly past the portion of the slide 3 which carries the plate when the slide 3 is in its forward position. In the grooves of the guides 200 is located a horizontal positioning slide 203 which consists in this instance of a flat sheet of metal or other suitable material having its central rear portion cut out to form rearwardly extending arm portions 204 and preferably having also a finger hole or recess 205 to facilitate moving it by hand, when desired. This slide 203 is readily movable back and forth in the grooves of the guides 200 and is normally held in its forward position by means of light springs 206 connected to the arms 204 and to the guides 200. Across the space between the arms 204, we provide a card or sheet supporting surface having an opening or openings therein of sufficient size to permit the card to be forced into proper impression contact with the engraved portions of the plate. We prefer to employ as the card or sheet supporting medium a very thin sheet 207 of some kind of textile material, for example, a thin piece of cotton or silk, although other material could be used, as certain kinds of paper. The material of the card or sheet supporting surface 207 should not only be extremely thin so as not to interfere with the impression, but should also preferably have a frictional surface so that the sheet or card will not be moved horizontally with respect to the supporting surface when the slide is actuated, to carry the sheet or card into impression position.

We therefore prefer a textile fabric as the fibrous surface offers a delicate friction to the under side of the card or sheet. The supporting surface 207 is also preferably provided with guides, marks, or indications for registering the card thereon by hand, or otherwise, so that it will be carried into exact registration with the engraved plate when the slide is actuated, as hereinafter described. The slide 203 is also supported in its guides 200 at such an elevation that the supporting surface 207 may be carried over the engraved plate as close thereto as possible without interfering with the operation, the flexibility of the fabric 207 permitting a deflection of the fabric with the card or sheet when the latter is forced into engagement with the plate by the impression mechanism. In the present instance we have shown the flexible material 207 provided with guide lines indicated at 208, marked thereon, to facilitate the placing of the card or sheet, but any other convenient means for insuring the registration of the card may be employed.

We prefer to provide automatic means for moving the sheet or card supporting slide 203 from its normal position forward of the impression slide plunger into impression position, at the instant that the plate carrying slide arrives at its foremost or impression position, beneath the impression mechanism. In the present instance we have shown the plate carrying slide 3 provided with a projection 209 adapted to engage an adjustable pin or screw 210 on an actuating lever 211, pivoted at 212 to the plate 202, said lever being provided with an arm 213, pivotally connected to the slide 203 by means permitting lost motion, in this instance a slot being provided in the arm 213 to engage a pin 214 in the slide 203. The screw 210 is adjusted and held in position by a set nut so that the slide 3 in its forward movement brings the stud 209 into contact with the screw 210, throwing the lever 211 forward and the arm 213 rearward, thus moving the sheet or card, indicated at 215, beneath the impression mechanism and in registration with the plate on the slide 3. As soon as the impression has been made, the slide 3 begins to move rearwardly, thus causing the pin 209 to recede from the screw 210, and the retracting springs 206 will again draw the slide 203 forward from beneath the impression mechanism so as to allow the card or sheet to be removed and another card or sheet placed in proper position on the supporting surface 207 of the slide 203. This arrangement permits the operator to place the cards or sheets in position to be printed, and to remove them from the slide 203 after they are impressed, without having to place his fingers beneath the impression mechanism, and the press may thus be operated at very high speed without endangering the operator.

We also prefer to provide means for stopping the operation of the press without stopping the rotation of the driving wheel 25 which may be operated from a line shaft or motor or other source of power. This may be accomplished by any desired means. In the present instance it is accomplished by means of mechanism illustrated in Figs. 15 to 18 inclusive. In these figures 24 represents the driving or crank shaft upon which the driving wheel 25 is loosely mounted and held in position by a collar 216. The hub of the wheel 25 is provided with a locking notch 217 to receive a spring bolt 218 carried in a clutch collar 219 rigidly connected to the shaft 24 and held normally in outward position by means of a spring 220. The bolt 218 is also provided with a recess 221 and the clutch collar 219 is provided with a groove 222 adapted to receive a segmental actuating plate 223 at the upper end of an arm 224, pivoted at 225 to the frame of the machine and provided with a hand lever 226. A spring 227 normally tends to withdraw the plate 223 from engagement with the groove 222 and hold the arm 224 against a stop pin 228. The plate 223 is thinner at one end than at the other and is provided with an inclined or actuating face 229 which engages the recess 221 in the bolt 218, when the arm 224 is in the position shown in Figs. 16 and 17, thereby withdrawing the bolt from engagement with the locking notch in the hub of the driving wheel, and permitting the machine to stop while the driving wheel continues to rotate. The press will remain disconnected from the driving wheel as long as the clutch lever is in the position shown in Figs. 16, 17, and we prefer to provide means for locking it in this position, so that the operator can make adjustments and work around the press without the necessity of holding the clutch lever 226. To this end we provide a locking pawl 230 having an inclined face 231 adapted to be engaged by the arm 206 when it is drawn down to move the pawl laterally and permit the shoulder 232 on the pawl to slip over the upper edge of the arm 226 and lock it in that position, as clearly indicated in Figs. 15 and 16. The pawl 231 is pivoted at 233 to the frame, and is provided with a spring 234 for holding it in operative position. This spring is preferably wound around the pivot 233 and has one end engaging a stationary pin 235 inserted in the main frame, and the other end engaging a pin 236 carried by the pawl. The pin 236 is preferably extended forwardly, as indicated in Fig. 16, on the front side of the pawl so that when it is desired to start the machine, it is only necessary to move the pawl 230 to the right (see Fig. 15) by means of the pin 236. This causes the pawl to release the clutch lever 226, thus permitting the spring to withdrawn the arm 234, thus withdrawing the plate 233 from the recess 221 in the clutch bolt 218. As the driving wheel 25 rotates, the recess 217 will be brought into alinement with the bolt 218, which will be forced by its spring into said recess, thus connecting the driving wheel to the driving shaft 24, and starting the machine.

What we claim and desire to secure by Letters Patent is:—

1. In a plate printing press, the combination with a horizontally movable support for an engraved plate, of a vertically movable impression counter and means for moving it into and out of operative relation with said support, a vertically movable inking counter provided with reduced inking surfaces corresponding with the positions of the engraved portions of the plate, for inking the engraved portions without inking the entire surface of the plate, a wiping and polishing device located adjacent to the path of the movable support, means for moving the inking counter into and out of operative relation with said support, means for moving the wiping and polishing device into and out of operative relation with said support, means for imparting to said wiping and polishing device relative motion with respect to said support while in operative relation therewith, and means for moving said support into operative relation with said inking counter, the wiping and polishing device and said impression counter.

2. In a plate printing press, the combination with a horizontally movable support for an engraved plate, of a vertically movable impression counter and means for moving it into and out of operative relation with said support, a vertically movable inking counter provided with reduced inking surfaces corresponding with the positions of the engraved portions of the plate, for inking the engraved portions without inking the entire surface of the plate, a wiping and polishing device located adjacent to the path of the movable support, means for moving the inking counter into and out of operative relation with said support, means for moving the wiping and polishing device into and out of operative relation with said support, means for imparting to said wiping and polishing device relative motion with respect to said support while in operative relation therewith, and means for moving said support into operative relation with said inking counter, the wiping and polishing device and said impression counter, said impression counter being provided with impression surfaces corresponding in location thereon with the location of the inking surfaces on said inking counter.

3. In a plate printing press, the combination with a movable support for an engraved plate, movable in a defined path, an inking device movable toward and from the path of said support, an impression device movable toward and from the path of said support, a wiping and polishing device movable toward and from the path of said support, and means for moving said support sequentially into operative relation with said inking device, said wiping and polishing device and said impression device, and means movable transversely of the path of said support for applying ink to said inking device.

4. In a plate printing press, the combination with a movable support for an engraved plate, movable in a defined path, an inking device movable toward and from the path of said support, an impression device movable toward and from the path of said support, a wiping and polishing device movable toward and from the path of said support, and means for moving said support sequentially into operative relation with said inking device, said wiping and polishing device and said impression device, means movable transversely of the path of said support for applying ink to said inking device, and means for operating said ink applying means when the inking device is out of operative relation with said support.

5. In a plate printing press, the combination with a movable support for an engraved plate, movable in a defined path, an inking device movable toward and from the path of said support, an impression device movable toward and from the path of said support, a wiping and polishing device movable toward and from the path of said support, and means for moving said support sequentially into operative relation with said inking device, said wiping and polishing device, and said impression device, a device movable transversely of the path of said support for applying ink to the inking device, a device movable in a plane parallel with the face of the plate support for applying polishing material to said wiping and polishing device, means for moving said impression device into operative relation with said support, and means for simultaneously operating said ink applying and polishing material applying devices.

6. In a plate printing press, the combination with a movable support for an engraved plate, movable in a defined path, an inking device movable toward and from the path of said support, an impression device movable toward and from the path of said support, a wiping and polishing device movable toward and from the path of said support, and means for moving said support sequentially into operative relation with said inking device, said wiping and polishing device and said impression device, a reciprocating device movable in a plane parallel with the surface of said support, provided with a part for engaging the wiping and polishing device to apply polishing material thereto, and means for supporting a supply of polishing material in the path of said reciprocating device.

7. In a plate printing press, the combination with a horizontally movable slide, means for reciprocating the same, a plate support carried by the slide, vertical reciprocating impression means, and inking mechanism for the plate, of a vertically movable rotary wiping and polishing device having a rotary pad located above the path of travel of said plate support, means for depressing the wiping and polishing pad into and out of engagement with the plate, a horizontally movable powder applying slide adapted to pass beneath the wiping and polishing pad, a powder applying device carried by said slide for engaging the face of the pad.

8. In a plate printing press, the combination with a horizontally movable slide, means for reciprocating the same, a plate support carried by the slide, vertical reciprocating impression means, and inking mechanism for the plate, of a vertically movable rotary wiping and polishing device having a rotary pad located above the path of travel of said plate support, means for depressing the wiping and polishing pad into and out of engagement with the plate, a horizontally movable powder applying slide adapted to pass beneath the wiping and polishing pad, a powder applying device carried by said slide for engaging the face of the pad, and vertically adjustable means for supporting a cake of polishing material above the powder applying device.

9. In a plate printing press, the combination with a horizontally movable slide provided with means for supporting the engraved plate to be printed, guides for said slide, and means for reciprocating said slide, a vertically movable impression device, adjacent to one end of said guides, and means for moving it into and out of operative relation with the slide, a vertically movable inking device located adjacent to said guides and provided with reduced inking surfaces of less area than that of the plate for inking the engraved portions of the plate, without inking the entire surface of the plate, means for moving said inking device into and out of operative relation with said slide, and means for supplying ink to the said inking surfaces, a rotary and vertically movable wiping and polishing device located above the path of said slide, means for imparting rotary motion to said wiping and polishing device, and means for moving it into and out of operative relation with said slide.

10. In a plate printing press, the combination with a horizontally movable slide provided with means for supporting the engraved plate to be printed, guides for said slide, and means for reciprocating said slide, a vertically movable impression device, adjacent to one end of said guides, and means for moving it into and out of operative relation with the slide, a vertically movable inking device located adjacent to said guides, and provided with reduced inking surfaces of less area than that of the plate for inking the engraved portions of the plate, without inking the entire surface of the plate, means for moving said inking device into and out of operative relation with said slide, and means for supplying ink to the said inking surfaces, a rotary and vertically movable wiping and polishing device located above the path of said slide, means for imparting rotary motion to said wiping and polishing device, means for moving it into and out of operative relation with said slide, means movable transversely of said guides for supplying polishing material to said wiping and polishing device, and operative connections for actuating the means for supplying polishing material, when the slide is out of vertical alinement with the wiping and polishing device.

11. In a plate printing press, the combination with a horizontally movable slide provided with means for supporting the engraved plate to be printed, guides for said slide, and means for reciprocating said slide, a vertically movable impression device, adjacent to one end of said guides, and means for moving it into and out of operative relation with the slide, a vertically movable inking device located adjacent to said guides and provided with reduced inking surfaces of less area than that of the plate for inking the engraved portions of the plate, without inking the entire surface of the plate, means for moving said inking device into and out of operative relation with said slide, and means for supplying ink to the said inking surfaces, a rotary and vertically movable wiping and polishing device located above the path of said slide, means for imparting rotary motion to said wiping and polishing device, and means for moving it into and out of operative relation with said slide, means for applying polishing material to the said wiping and polishing device, and operative connections operating in timed relation with the means for reciprocating the said slide and for operating said impression device, for actuating the polishing material applying and ink applying means, during the operation of the impression device.

12. In a plate printing press, the combination with a horizontally movable slide provided with means for supporting the engraved plate to be printed, guides for said slide, and means for reciprocating said slide, a vertically movable impression device, adjacent to one end of said guides, and means for moving it into and out of operative relation with the slide, a vertically movable inking device located adjacent to said guides and provided with reduced inking surfaces of less area than that of the plate for inking the engraved portions of the plate, without inking the entire surface of the plate, means for moving said inking device into and out of operative relation with said slide, an ink supplying means located at one side of said guides, a transversely movable ink applying roll adapted to pass beneath the inking device when the latter is in raised position, and means for reciprocating said roll between the ink supplying means and the inking device, a vertically movable, rotatable wiping and polishing device located above the path of said slide, means for supporting a supply of polishing material at one side of said guides, a transversely movable device, adapted to engage said polishing material, and movable beneath the wiping and polishing device when the latter is in raised position, and means for reciprocating said movable device between the polishing material supply, and the wiping and polishing device.

13. In a plate printing press, the combination with a horizontally movable means for supporting the engraved plate, of vertically movable impression means, vertically movable inking means, and plate wiping and polishing means located adjacent to the path of travel of the movable plate supporting means, of horizontally movable feeding mechanism provided with a supporting surface for the card or sheet, normally located out of registration with the impression mechanism, and means for moving said supporting surface between the plate supporting means and impression means to carry the sheet or card into registration with the plate to receive the impression therefrom.

14. In a plate printing press, the combination with a horizontally movable means for supporting the engraved plate, of vertically movable impression means, vertically movable inking means, and plate wiping and polishing means located adjacent to the path of travel of said movable plate supporting means, of a horizontally movable feeding device provided with a horizontally flexible supporting surface perforated to permit an impression to be made therethrough, and located normally out of vertical alinement with the impression means, and means for moving said device between the plate supporting means and impression means, and for returning it to normal position.

15. In a plate printing press, the combination with a horizontally movable means for supporting the engraved plate, of vertically movable impression means, vertically movable inking means, and plate wiping and polishing means located adjacent to the path of travel of said movable plate supporting means, of a horizontally movable slide, a card or sheet supporting surface of flexible fabric carried thereby and located normally out of vertical alinement with the impression means and perforated to permit impressions to be made therethrough, means for moving said slide in one direction to carry the card or sheet into registration with the plate, and retracting means for said slide.

16. In a plate printing press, the combination with a horizontally movable means for supporting the engraved plate, of vertically movable impression means, vertically movable inking means, and plate wiping and polishing means located adjacent to the path of travel of said movable plate supporting means, of a horizontally movable slide provided with a sheet or card support of flexible material perforated to permit impressions to be made therethrough and having a frictional sheet engaging surface, retracting springs normally holding said slide in inoperative position with respect to the impression mechanism, and operating means for moving said slide between the plate and the impression mechanism to carry the card or sheet into registration with the sheet.

17. In a plate printing press, the combination with a horizontally movable means for supporting the engraved plate, of vertically movable impression means, vertically movable inking means, and plate wiping and polishing means located adjacent to the path of travel of said movable plate supporting means, of a horizontally movable slide provided with a sheet or card support of flexible material perforated to permit impressions to be made therethrough and having a frictional sheet engaging surface, retracting springs normally holding said slide in inoperative position with respect to the impression mechanism, operating means for moving said slide between the plate and the impression mechanism to carry the card or sheet into registration with the sheet, and means carried by the plate supporting means for actuating said slide operating means.

In testimony whereof, we affix our signatures.

MANUEL LAZARUS.
WILLIAM B. DAVIES.